United States Patent
Liu

(10) Patent No.: US 9,826,452 B2
(45) Date of Patent: Nov. 21, 2017

(54) APPARATUSES AND METHODS FOR ACCESS DOMAIN SELECTION (ADS) DURING AN INTER-RADIO ACCESS TECHNOLOGY (IRAT) PROCEDURE

(71) Applicant: MediaTek Inc., Hsin-Chu (TW)

(72) Inventor: Te-Huang Liu, Zhubei (TW)

(73) Assignee: MEDIATEK INC., Hsin-Chu (TW)

( * ) Notice: Subject to any disclaimer, the term of this patent is extended or adjusted under 35 U.S.C. 154(b) by 202 days.

(21) Appl. No.: 14/684,670

(22) Filed: Apr. 13, 2015

(65) Prior Publication Data

US 2015/0296433 A1    Oct. 15, 2015

Related U.S. Application Data

(60) Provisional application No. 61/979,114, filed on Apr. 14, 2014.

(51) Int. Cl.
*H04W 36/14* (2009.01)
*H04W 36/00* (2009.01)
*H04W 36/18* (2009.01)

(52) U.S. Cl.
CPC ....... *H04W 36/14* (2013.01); *H04W 36/0022* (2013.01); *H04W 36/18* (2013.01)

(58) Field of Classification Search
CPC .. H04W 36/18; H04W 36/24; H04W 36/0022
See application file for complete search history.

(56) References Cited

U.S. PATENT DOCUMENTS

| 7,796,553 | B2 * | 9/2010 | Lee ................... | H04W 36/0066 370/331 |
| 8,880,078 | B2 * | 11/2014 | Kim ...................... | H04W 24/08 370/332 |
| 9,036,599 | B2 * | 5/2015 | Chin ................... | H04W 76/046 370/331 |
| 9,277,430 | B2 * | 3/2016 | Gopal ................... | H04W 24/08 |
| 9,516,533 | B2 * | 12/2016 | Xu ........................ | H04W 24/10 |
| 2007/0177546 | A1 * | 8/2007 | Lee ................... | H04W 36/0066 370/331 |
| 2009/0196286 | A1 | 8/2009 | Long et al. | |

(Continued)

FOREIGN PATENT DOCUMENTS

| CN | 101090567 | 12/2007 |
| CN | 101146367 | 3/2008 |

OTHER PUBLICATIONS

"Universal Mobile Telecommunications System (UMTS); Service Aspects; Service Principles;" 3GPP TS 22.101; Jan. 2008; pp. 1-50.

(Continued)

*Primary Examiner* — Omer S Mian
(74) *Attorney, Agent, or Firm* — McClure, Qualey & Rodack, LLP

(57) ABSTRACT

A mobile communication device with a processor is provided. The processor determines whether an Inter-Radio Access Technology (IRAT) procedure is ongoing when receiving a request for a Mobile Originated (MO) call, starts a first guard timer in response to the IRAT procedure being ongoing, and performs an Access Domain Selection (ADS) for making the MO call in response to the IRAT procedure being completed and the first guard timer not expiring.

12 Claims, 6 Drawing Sheets

(56) References Cited

U.S. PATENT DOCUMENTS

| | | | | |
|---|---|---|---|---|
| 2009/0280812 | A1* | 11/2009 | Cheng | H04W 76/046 455/436 |
| 2011/0176511 | A1* | 7/2011 | Sayeedi | H04W 36/0016 370/331 |
| 2011/0191430 | A1 | 8/2011 | Griot et al. | |
| 2011/0319071 | A1 | 12/2011 | Beppler et al. | |
| 2012/0064886 | A1* | 3/2012 | Kim | H04W 24/04 455/423 |
| 2014/0176600 | A1* | 6/2014 | Khay-Ibbat et al. | 348/14.02 |
| 2015/0036512 | A1* | 2/2015 | Xu | H04W 24/10 370/242 |
| 2015/0271763 | A1* | 9/2015 | Balachandran | H04W 52/245 370/338 |
| 2015/0289153 | A1* | 10/2015 | Gopal | H04W 24/08 455/436 |
| 2015/0296401 | A1* | 10/2015 | Hamilton | H04W 36/0083 370/252 |
| 2015/0296433 | A1* | 10/2015 | Liu | H04W 36/0022 370/331 |
| 2016/0044737 | A1* | 2/2016 | Kwon | H04W 76/046 370/328 |
| 2016/0302114 | A1* | 10/2016 | Jain | H04W 36/0083 |

OTHER PUBLICATIONS

"Universal Mobile Telecommunications System (UMTS); LTE; IP Multimedia Subsystem (IMS) Emergency Sessions;" 3GPP TS 23.167; Jun. 2009; pp. 1-38.

"Universal Mobile Telecommunications System (UMTS); Non-Access-Stratum (NAS) Protocol for Evolved Packet System (EPS) Stage 3;" 3GPP TS 24.301; Jun. 2009; pp. 1-240.

"Digital Cellular Telecommunications System (Phase 2+); Universal Mobile Telecommunications System (UMTS) LTE; Architectural Requirements;" 3GPP TS 23.221; Jan. 2013; pp. 1-50.

* cited by examiner

APPARATUSES AND METHODS FOR ACCESS DOMAIN SELECTION (ADS) DURING AN INTER-RADIO ACCESS TECHNOLOGY (IRAT) PROCEDURE

CROSS REFERENCE TO RELATED APPLICATIONS

This Application claims priority of U.S. Provisional Application No. 61/979,114, filed on Apr. 14, 2014, the entirety of which is incorporated by reference herein.

BACKGROUND OF THE INVENTION

Field of the Invention

The invention generally relates to handling a request for a Mobile Originated (MO) call, and more particularly, to apparatuses and methods for Access Domain Selection (ADS) during an ongoing IRAT (Inter-Radio Access Technology) procedure when the request for an MO call is received.

Description of the Related Art

With growing demand for ubiquitous computing and networking, various Radio Access Technologies (RATs) have been developed, such as the Global System for Mobile communications (GSM) technology, General Packet Radio Service (GPRS) technology, Enhanced Data rates for Global Evolution (EDGE) technology, Wideband Code Division Multiple Access (WCDMA) technology, High Speed Packet Access (HSPA) technology, Long Term Evolution (LTE) technology, Time-Division LTE (TD-LTE) technology, LTE-Advanced (LTE-A) technology, and others.

Generally, a mobile phone only supports one RAT with one subscriber identity card for providing users with the flexibility of mobile communications at all times via the supported RAT using the single subscriber identity card. However, due to the complexity of various network deployments, so-called multimode mobile phones have been developed, which generally support two or more RATs and select one of the RATs for obtaining mobile services.

Since multimode mobile phones support multiple RATs, the Access Domain Selection (ADS) becomes an important issue for such mobile phones, especially when receiving a request for making a Mobile Originated (MO) call, such as a voice call or video call. For example, in second-generation (2G) networks (e.g., GSM/GPRS/EDGE networks) or third-generation (3G) networks (e.g., WCDMA networks), voice calls can only be made through the Circuit-Switched (CS) domain. In HSPA or LTE-based networks, voice or video calls can only be made through the IP Multimedia Subsystem (IMS) domain. That is, a multimode mobile phone is required to decide in which access domain the MO call should be made depending on the currently used RAT.

However, when an IRAT procedure is ongoing (i.e., when the multimode mobile phone is switching from one RAT to another, e.g., moving from an LTE network to a GSM network), the ADS may not be able to decide a proper access domain for the MO call due to the currently used RAT being indeterminate. As a result, the probability of the MO call being rejected by the network may increase if an improper access domain is selected.

BRIEF SUMMARY OF THE INVENTION

In order to solve the aforementioned problem, the invention proposes to defer the ADS when an IRAT procedure is ongoing, thereby enabling the ADS to decide a proper access domain and increasing the successful rate of making the MO call.

In one aspect of the invention, a mobile communication device comprising a processor is provided. The processor is configured to determine whether an IRAT procedure is ongoing when receiving a request for an MO call, start a first guard timer in response to the IRAT procedure being ongoing, and perform an ADS for making the MO call in response to the IRAT procedure being completed and the first guard timer not expiring.

In another aspect of the invention, a method for ADS during an IRAT procedure, executed by a mobile communication device, is provided. The method comprises the steps of: determining whether an IRAT procedure is ongoing when receiving a request for an MO call; starting a first guard timer in response to the IRAT procedure being ongoing; and performing an ADS for making the MO call in response to the IRAT procedure being completed and the first guard timer not expiring.

Other aspects and features of the present invention will become apparent to those with ordinarily skill in the art upon review of the following descriptions of specific embodiments of the mobile communication devices and the methods for ADS during an IRAT procedure.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof. Note that the 3rd Generation Partnership Project (3GPP) specifications described herein are used to teach the spirit of the invention, and the invention is not limited thereto.

Figure 1:
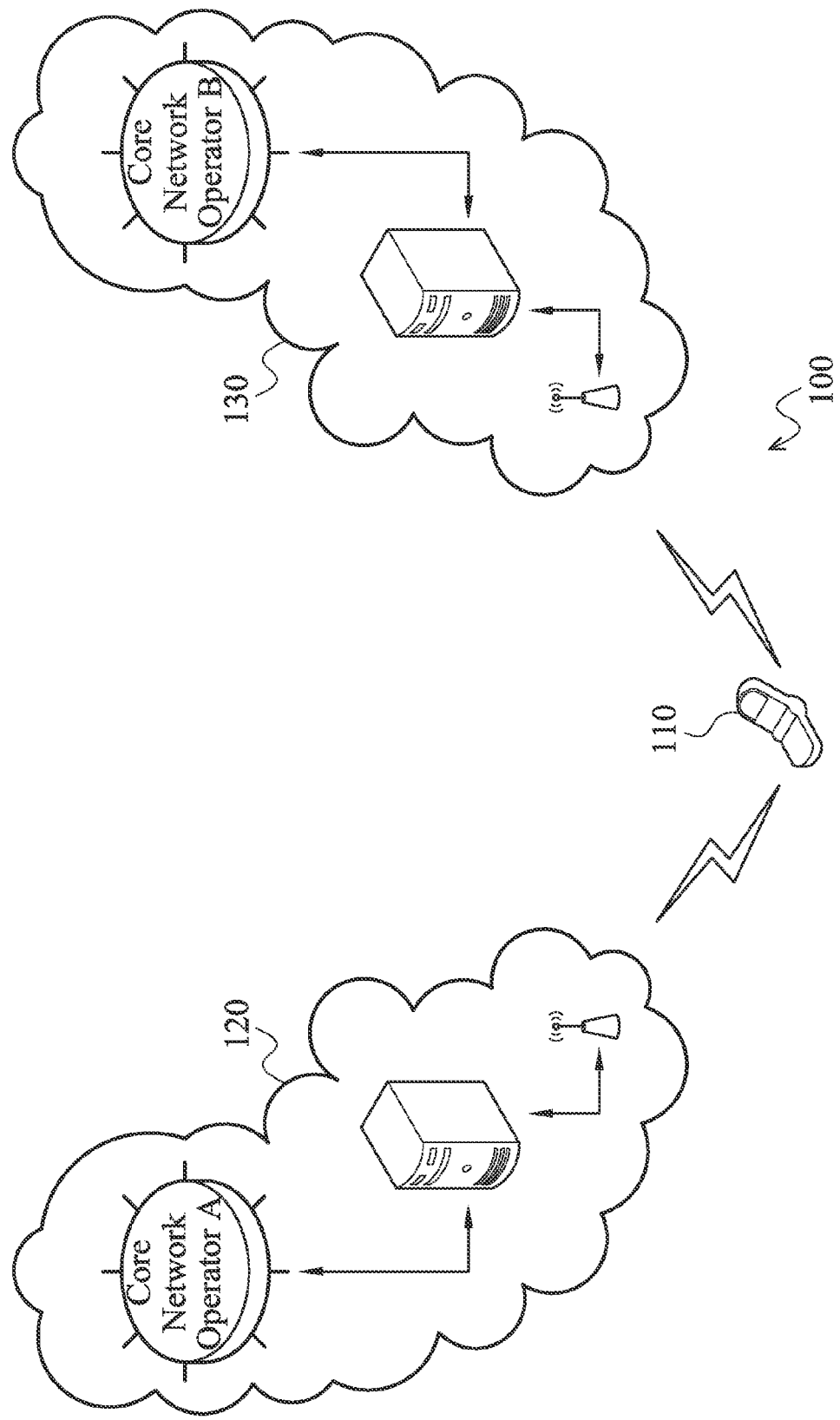
FIG. 1 is a block diagram illustrating a wireless communications environment according to an embodiment of the invention.

FIG. 1 is a block diagram illustrating a wireless communications environment according to an embodiment of the invention. The wireless communications environment 100 comprises a mobile communication device 110, and service networks 120 and 130. The service network 120 is an LTE-based network, such as an LTE, TD-LTE, or LTE-A network, while the service network 130 is a legacy network, such as a 2G network (e.g., a GSM, GPRS, or EDGE network) or a 3G network (e.g., a WCDMA network). For example, the service network 120 may be an LTE network while the service network 130 may be a GSM/GPRS/EDGE network. An LTE network may comprise an access network and a core network, wherein the access network may be an Evolved-Universal Terrestrial Radio Access Network (E-UTRAN) which includes at least an evolved NB (eNB), and the core network may be an Evolved Packet Core (EPC) which includes a Home Subscriber Server (HSS), Mobility Management Entity (MME), Serving Gateway (S-GW), Packet Data Network Gateway (PDN-GW or P-GW). A GSM/GPRS/EDGE network may comprise an access network and a core network, wherein the access network may be a Base Station Subsystem (BSS) which includes at least a Base Transceiver Station (BTS) and a Base Station Controller (BSC), and the core network may be a GPRS core which includes a Home Location Register (HLR), at least one Serving GPRS Support Node (SGSN), at least one Gateway GPRS Support Node (GGSN). Alternatively, if the service network 130 is a WCDMA network, it may comprise an access network and a core network, wherein the access network may be a UTRAN which includes at least a Node B and a Radio Network Controller (RNC), and the core network may be a GPRS core.

The mobile communication device 110 may selectively communicate with the service network 120 or 130 for obtaining mobile services, including CS and/or PS services. The CS services may include voice call services, and Short Message Service (SMS), etc., and the PS services may include Video-over-LTE (ViLTE) services, Voice-over-LTE (VoLTE) services, and data services, such as e-mail transmission, web browsing, file upload/download, instant messaging, streaming video, or others. That is, the mobile communication device 110 is a multimode mobile phone which supports multiple RATs including the RATs utilized by the service networks 120 and 130. In another embodiment, the mobile communication device 110 may be used as an external data card for a computer host, notebook, or panel PC to access Internet resources.

Figure 2:
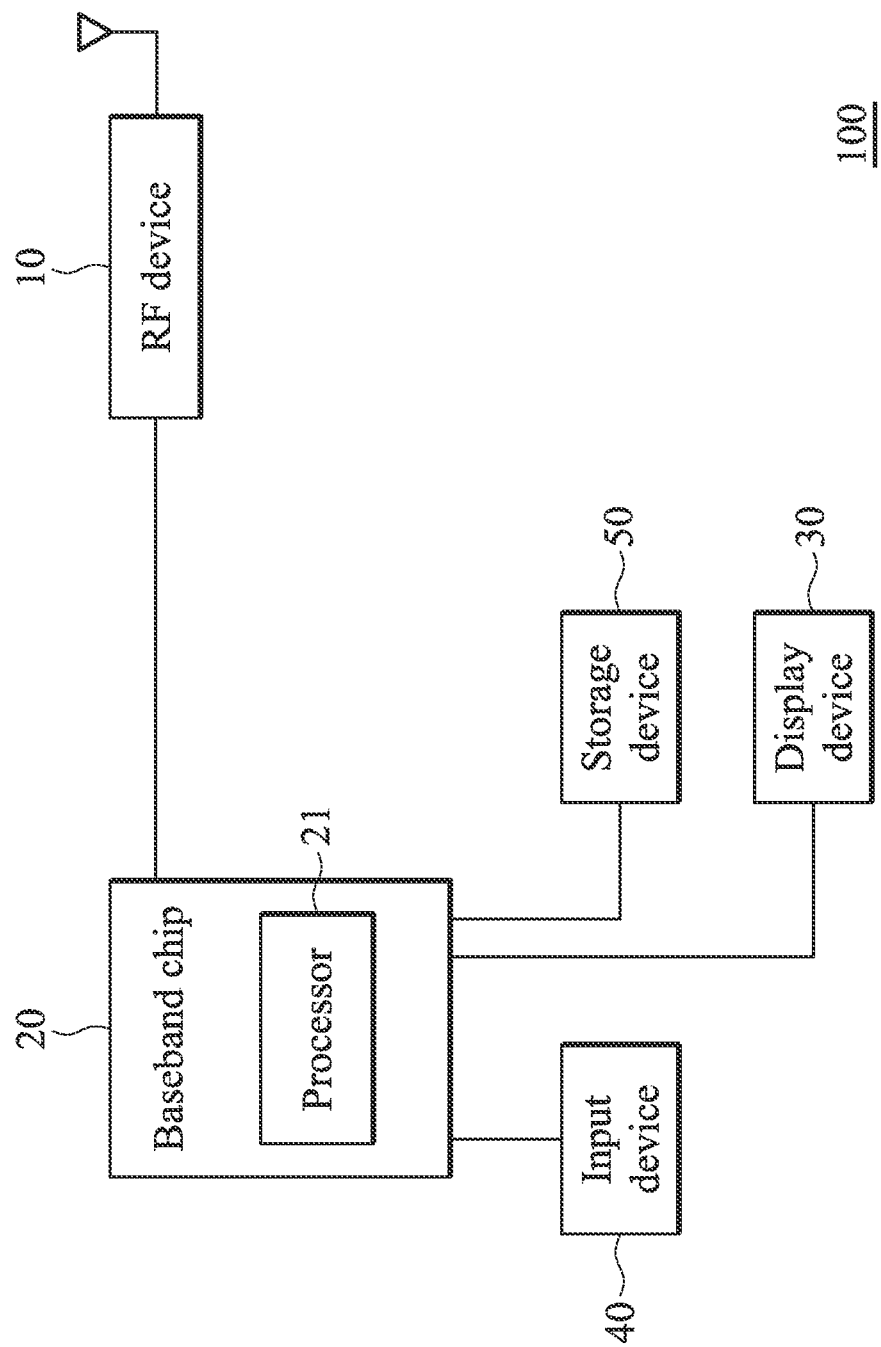
FIG. 2 is a block diagram illustrating the mobile communication device 110 according to an embodiment of the invention.

FIG. 2 is a block diagram illustrating the mobile communication device 110 according to an embodiment of the invention. The mobile communication device 110 comprises a Radio Frequency (RF) device 10, a Baseband chip 20, a display device 30, an input device 40, and a storage device 50, wherein the RF device 10, the display device 30, the input device 40, and the storage device 50 are coupled to the Baseband chip 20. The Baseband chip 20 comprises a processor 21, such as a general-purpose processor, a Micro Control Unit (MCU), a Digital Signal Processor (DSP), or the like, for controlling the RF device 10, sending a series of frame data (e.g. representing text messages, graphics, images or others) to the display device 30, receiving signals from the input device 40, and storing and retrieving data to and from the storage device 50. Most importantly, the processor 21 coordinates the above mentioned operations of the RF device 10, the display device 30, the input device 40, and the storage device 50 for performing the method for ADS during an IRAT procedure in the invention.

Additionally, the Baseband chip 20 may also contain other hardware components to perform baseband signal processing, including Analog-to-Digital Conversion (ADC)/Digital-to-Analog Conversion (DAC), gain adjusting, modulation/demodulation, encoding/decoding, and so on. The RF device 10 may receive RF wireless signals via the antenna, convert the received RF wireless signals to baseband signals, which are processed by the Baseband chip 20, or receive baseband signals from the Baseband chip 20 and convert the received baseband signals to RF wireless signals, which are later transmitted via the antenna. The RF device 10 may also contain multiple hardware devices to perform radio frequency conversion. For example, the RF device 10 may comprise a mixer to multiply the baseband signals with a carrier oscillated in the radio frequency of the supported RATs, wherein the radio frequency may be 900 MHz, 1800 MHz or 1900 MHz utilized in GSM/GPRS/EDGE technology, or may be 900 MHz, 1900 MHz or 2100 MHz utilized in WCDMA technology, or may be 900 MHz, 2100 MHz, or 2.6 GHz utilized in LTE/LTE-A/TD-LTE technology, or others, depending on the RAT in use.

The display device 30 may be a Liquid Crystal Display (LCD), Light-Emitting Diode (LED) display, or Electronic Paper Display (EPD), etc., for providing a display function. Alternatively, the display device 30 may further comprise one or more touch sensors disposed thereon or thereunder for sensing touches, contacts, or approximations of objects, such as fingers or styluses.

The input device 40 may comprise one or more buttons, a keyboard, a mouse, a touch pad, a video camera, a microphone, and/or a speaker, etc., serving as the Man-Machine Interface (MMI) for interaction with users.

The storage device 50 may be a memory, such as a FLASH memory or a Non-volatile Random Access Memory (NVRAM), or a magnetic storage device, such as a hard disk or a magnetic tape, or an optical disc, or any combination thereof for storing communication data for the Baseband chip 20, instructions and/or program codes of applications, and/or user data.

Figure 3A:
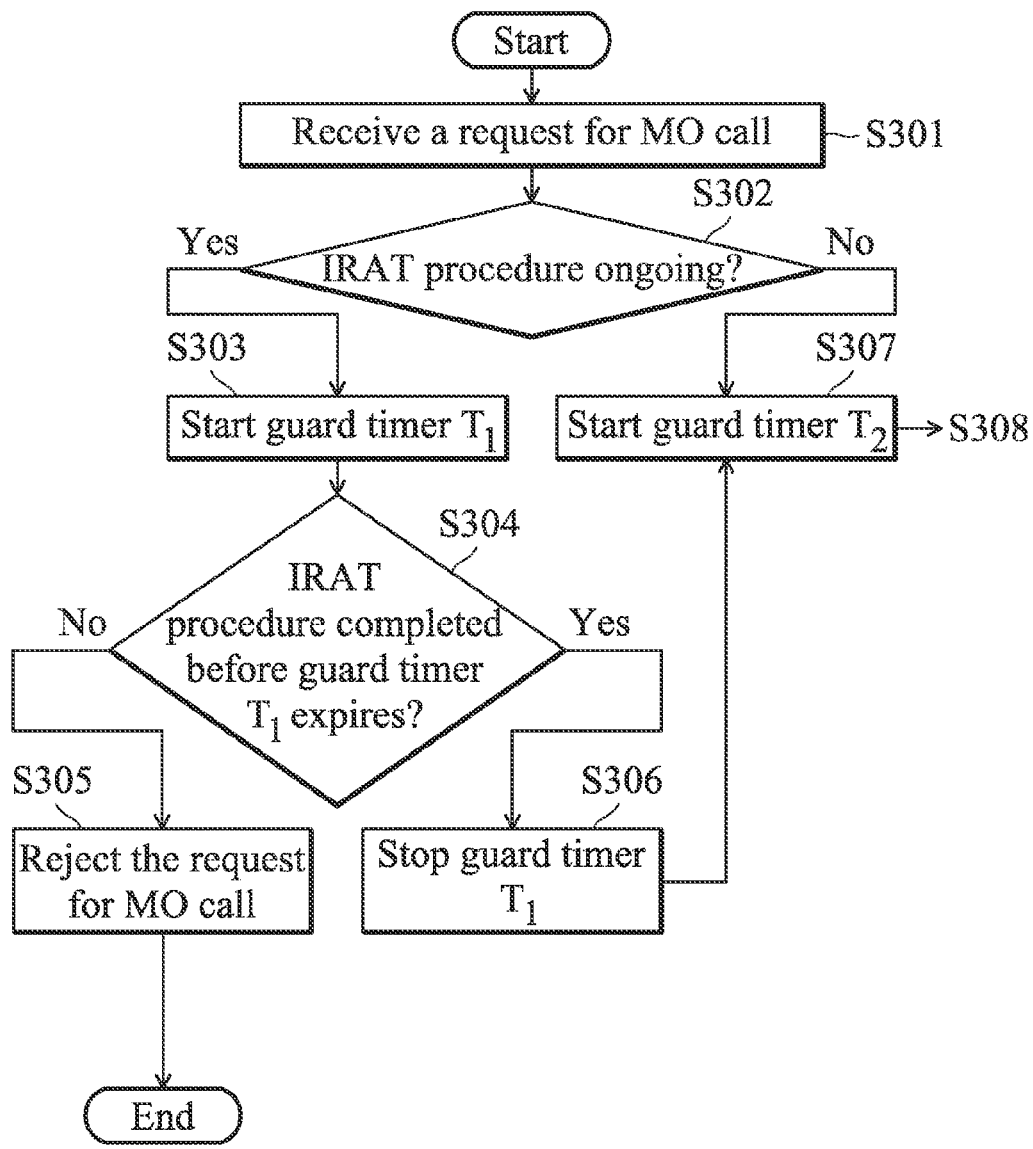
FIGS. 3A and 3B show a flow chart illustrating the method for ADS during an IRAT procedure according to an embodiment of the invention.
Figure 3B:
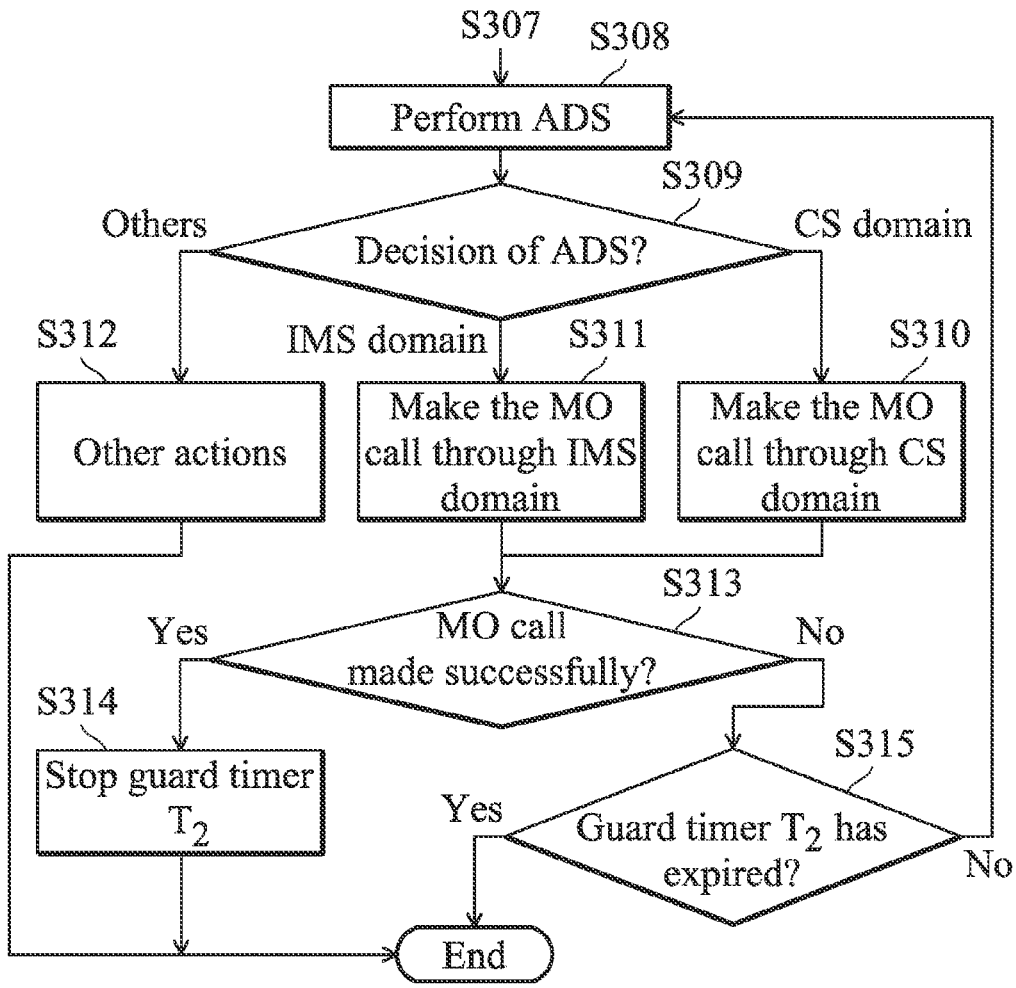

FIGS. 3A and 3B show a flow chart illustrating the method for ADS during an IRAT procedure according to an embodiment of the invention. In this embodiment, the method is applied to the mobile communication device 110 which supports the LTE technology and the 2G or 3G technology, and specifically executed by a processor of the mobile communication device 110. To begin, the mobile communication device 110 receives a request for an MO call (step S301). The MO call may be requested by the upper layer (e.g., the Non-Access Stratum (NAS) layer or the Application layer) of the communication protocol in use. Next, the mobile communication device 110 determines whether an IRAT procedure is ongoing (step S302), and if so, starts a guard timer $T_1$ (step S303).

Subsequent to step S303, the mobile communication device 110 determines whether the IRAT procedure is completed before the guard timer $T_1$ expires (step S304), and if not, rejects the request for the MO call (step S305), and the method ends. In one embodiment, the mobile communication device 110 may reject the request for the MO call by sending an indication with a failure cause (e.g., "Service Not Available") to the upper layer.

Subsequent to step S304, if the IRAT procedure is completed before the guard timer $T_1$ expires, the mobile communication device 110 stops the guard timer $T_1$ (step S306), and then starts another guard timer $T_2$ (step S307) and performs the ADS (step S308). Specifically, the ADS may take the following factors into account for deciding an access domain for making the MO call: 1) the state of the mobile communication device 110 in the CS domain (e.g., the state information may indicate "Detached" or "Attached"); 2) the state of the mobile communication device 110 in the IMS domain (e.g., the state information may indicate "Registered" or "Unregistered"); 3) the access domain used by an existing session/call for the same service; 4) user preferences and any available operator policy (e.g., the IMS domain for VoLTE is preferred); 5) the "IMS voice over PS session supported indication" as defined in the 3GPP Technical Specifications (TS) 23.030 and 23.401; 6)

whether the mobile communication device 110 is expected to behave in a "Voice centric" or "Data centric" way; 7) whether the mobile communication device 110 supports the IMS PS voice service; 8) indications provided by the service network 120 or 130 via the Evolved Packet System/International Mobile Subscriber Identity (EPS/IMSI) ATTACH or TRACKING AREA UPDATE message (e.g., "SMS-only" indication or "CSFB Not Preferred" indication as defined in the 3GPP TS 23.272).

After that, it is determined whether the decision of the ADS is the CS domain, the IMS domain, or others (step S309). If the decision of the ADS is the CS domain, the mobile communication device 110 makes the MO call through the CS domain of the service network 130 (step S310). In one embodiment, if the mobile communication device 110 is currently camped on or connected with the service network 120 and the decision of the ADS is the CS domain, it is first required to perform a Circuit Switched Fallback (CSFB) procedure to switch from the service network 120 to the service network 130 before step S310.

If the decision of the ADS is the IMS domain, the mobile communication device 110 makes the MO call through the IMS domain of the service network 120 (step S311). If the decision of the ADS is not the CS domain and not the IMS domain, the mobile communication device 110 performs other actions (step S312), e.g., performs Public Land Mobile Network (PLMN) search.

Subsequent to steps S310 and S311, it is determined whether the MO call is made successfully (step S313), and if so, the mobile communication device 110 stops the guard timer $T_2$ (step S314) and the method ends. Otherwise, if the MO call fails, it is determined whether the guard timer $T_2$ has expired (step S315). If the guard timer $T_2$ has expired, the method ends. If the guard timer $T_2$ has not expired, the method goes to step S308 to repeat the ADS.

Figure 4A:
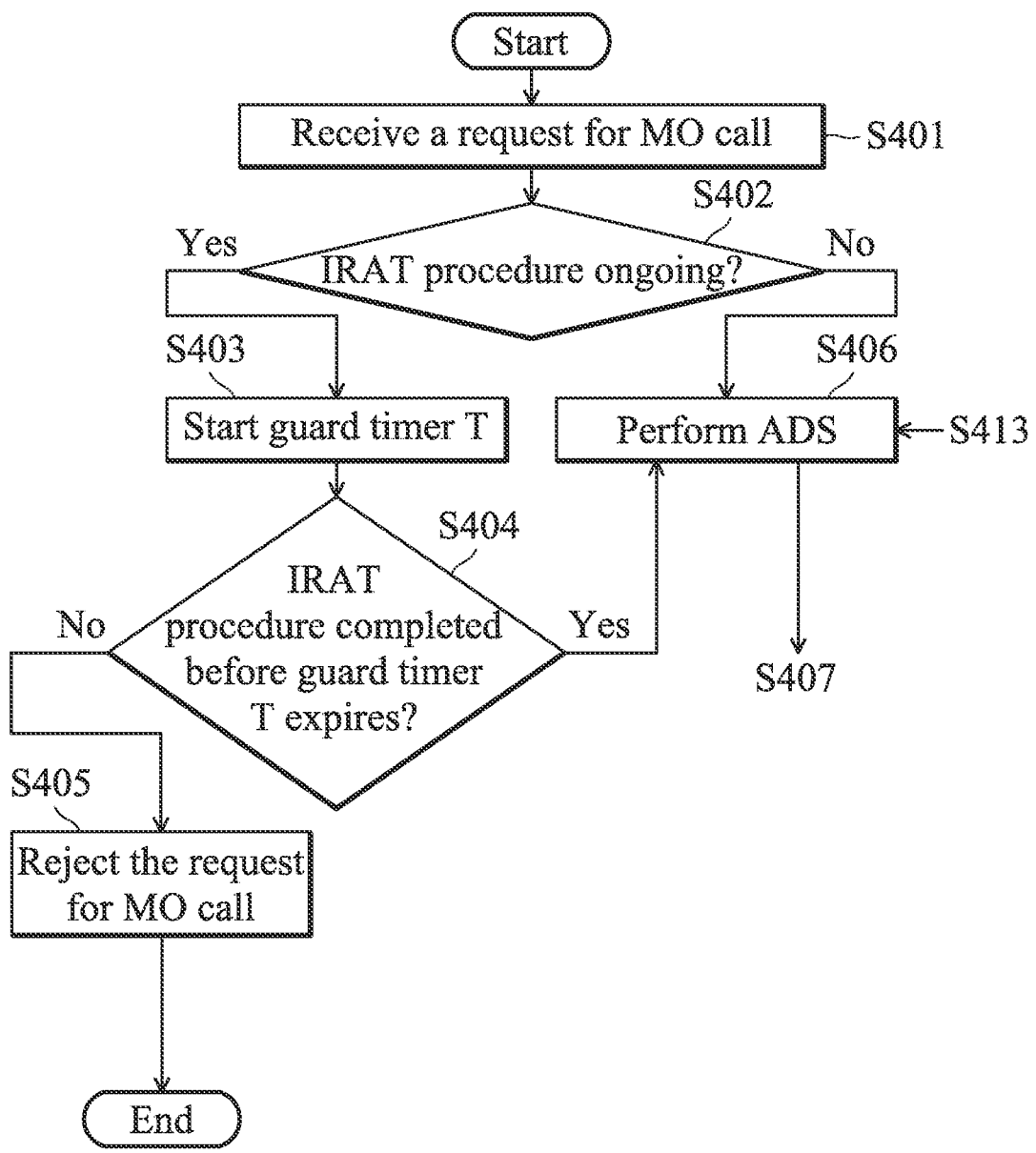
FIGS. 4A and 4B show a flow chart illustrating the method for ADS during an IRAT procedure according to another embodiment of the invention.
Figure 4A:
Figure 4B:
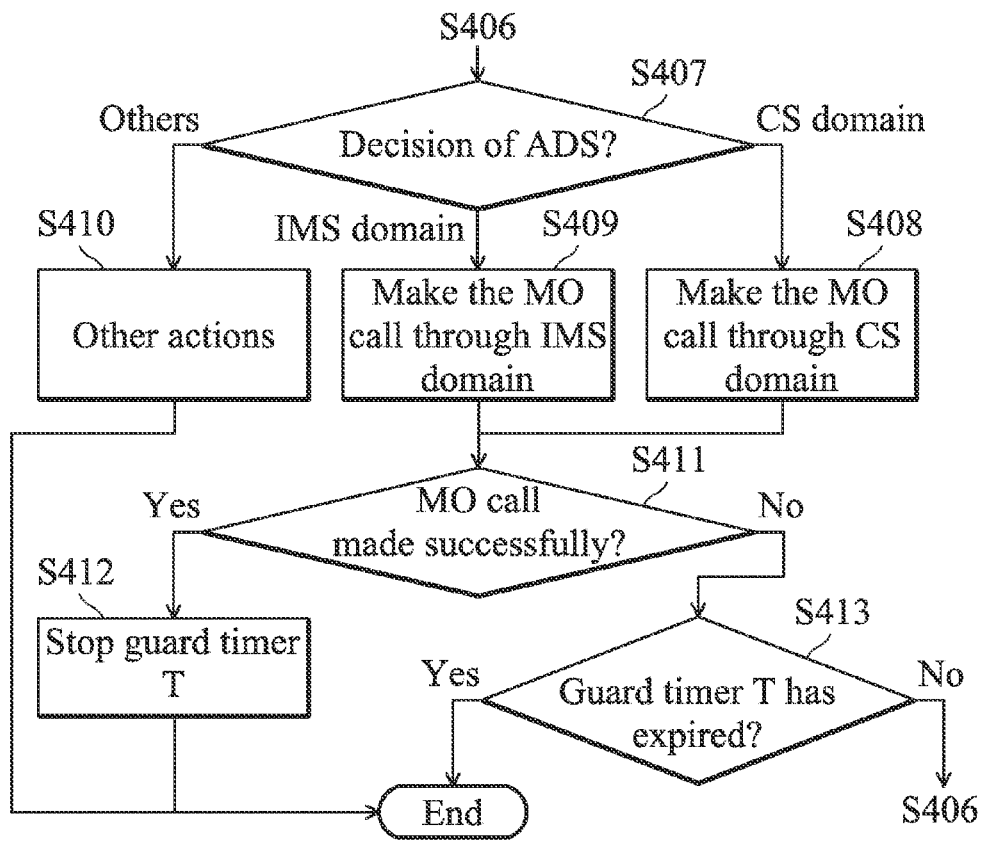

FIGS. 4A and 4B show a flow chart illustrating the method for ADS during an IRAT procedure according to another embodiment of the invention. Similar to the embodiment of FIGS. 3A and 3B, the method is applied to the mobile communication device 110, and specifically executed by a processor of the mobile communication device 110. To begin, the mobile communication device 110 receives a request for an MO call (step S401). The MO call may be requested by the upper layer (e.g., the NAS layer or the Application layer) of the communication protocol in use. Next, the mobile communication device 110 determines whether an IRAT procedure is ongoing (step S402), and if so, starts a guard timer T (step S403).

Subsequent to step S403, the mobile communication device 110 determines whether the IRAT procedure is completed before the guard timer T expires (step S404), and if not, rejects the request for the MO call (step S405), and the method ends. In one embodiment, the mobile communication device 110 may reject the request for the MO call by sending an indication with a failure cause (e.g., "Service Not Available") to the upper layer.

Subsequent to step S404, if the IRAT procedure is completed before the guard timer T expires, the mobile communication device 110 performs the ADS (step S406). The ADS is similar to that in the embodiment of FIGS. 3A and 3B, and the detailed description is not repeated herein for brevity.

After that, it is determined whether the decision of the ADS is the CS domain, the IMS domain, or others (step S407). If the decision of the ADS is the CS domain, the mobile communication device 110 makes the MO call through the CS domain of the service network 130 (step S408). If the decision of the ADS is the IMS domain, the mobile communication device 110 makes the MO call through the IMS domain of the service network 120 (step S409). If the decision of the ADS is not the CS domain and not the IMS domain, the mobile communication device 110 performs other actions (step S410).

Subsequent to steps S408 and S409, it is determined whether the MO call is made successfully (step S411), and if so, the mobile communication device 110 stops the guard timer T (step S412) and the method ends. Otherwise, if the MO call fails, it is determined whether the guard timer T has not expired (step S413). If the guard timer T has not expired, the method goes to step S406 to repeat the ADS. If the guard timer T has expired, the method ends.

Please note that, unlike the embodiment of FIGS. 3A and 3B using two separate guard timers $T_1$ and $T_2$ for guarding the IRAT procedure and the ADS, respectively, the embodiment of FIGS. 4A and 4B only uses one guard timer T for guarding both the IRAT procedure and the ADS.

In another embodiment, if another RAT change is required after the MO call is made successfully through the IMS domain of the service network 120, the mobile communication device 110 may perform the Single Radio Voice Call Continuity (SRVCC) procedure to continue the MO call through the CS domain of the service network 130. Alternatively, if another RAT change is required during the making of the MO call through the IMS domain of the service network 120, the MO call may fail.

While the invention has been described by way of example and in terms of preferred embodiment, it is to be understood that the invention is not limited thereto. Those who are skilled in this technology can still make various alterations and modifications without departing from the scope and spirit of this invention. For example, the method of FIGS. 3A, 3B, 4A, and 4B may be implemented in program code stored in a machine-readable storage medium, such as a magnetic tape, semiconductor, magnetic disk, optical disc (e.g., CD-ROM, DVD-ROM, etc.), or others, which is loaded and executed by the processor of the mobile communication device. Therefore, the scope of the present invention shall be defined and protected by the following claims and their equivalents.

What is claimed is:

1. A mobile communication device, comprising:
    a processor configured to:
    determine whether an Inter-Radio Access Technology (IRAT) procedure is ongoing at the mobile communication device in response to receiving a request for a Mobile Originated (MO) call from an upper layer, the upper layer being higher than network layer,
    start a first guard timer in response to determining that the IRAT procedure is ongoing,
    perform an Access Domain Selection (ADS) for making the MO call in response to completing the IRAT procedure before the first guard timer expires and stopping the first guard timer,
    start a second guard timer in response to performing the ADS, and continuously re-perform the ADS for making the MO call in response to the ADS having been failed until the second guard timer expires.

2. The mobile communication device of claim 1, wherein the processor is further configured to reject the request for the MO call in response to not completing the IRAT procedure before the first guard timer expires.

3. The mobile communication device of claim 1, wherein the processor is further configured to stop the first guard timer in response to making the MO call successfully.

4. The mobile communication device of claim 1, wherein the processor is further configured to stop the second guard timer in response to making the MO call successfully.

5. The mobile communication device of claim 1, wherein the IRAT procedure comprises switching the mobile communication device from a Long Term Evolution (LTE)-based network to a second-generation (2G) or third-generation (3G) network, or switching the mobile communication device from the 2G or 3G network to the LTE-based network.

6. The mobile communication device of claim 5, wherein the ADS generates a decision of making the MO call through a Circuit-Switched (CS) domain of the 2G or 3G network or through an IP Multimedia Subsystem (IMS) domain of the LTE-based network.

7. A method for Access Domain Selection (ADS) during an IRAT (Inter-Radio Access Technology) procedure, executed by a mobile communication device, the method comprising:
    determining whether an IRAT procedure is ongoing at the mobile communication device in response to receiving a request for a Mobile Originated (MO) call from an upper layer, the upper layer being higher than network layer;
    starting a first guard timer in response to determining that the IRAT procedure is ongoing;
    performing an ADS for making the MO call in response to completing the IRAT procedure before the first guard timer expires and stopping the first guard timer;
    starting a second guard timer in response to performing the ADS; and
    continuously re-performing the ADS for making the MO call in response to the ADS having been failed until the second guard timer expires.

8. The method of claim 7, further comprising:
    rejecting the request for the MO call in response to not completing the IRAT procedure before the first guard timer expires.

9. The method of claim 7, further comprising:
    stopping the first guard timer in response to making the MO call successfully.

10. The method of claim 7, further comprising:
    stopping the second guard timer in response to making the MO call successfully.

11. The method of claim 7, wherein the IRAT procedure comprises switching the mobile communication device from a Long Term Evolution (LTE)-based network to a second-generation (2G) or third-generation (3G) network, or switching the mobile communication device from the 2G or 3G network to the LTE-based network.

12. The method of claim 11, wherein the ADS generates a decision of making the MO call through a Circuit-Switched (CS) domain of the 2G or 3G network or through an IP Multimedia Subsystem (IMS) domain of the LTE-based network.

* * * * *